US006837128B2

United States Patent
Campagnolo

(10) Patent No.: US 6,837,128 B2
(45) Date of Patent: Jan. 4, 2005

(54) BICYCLE SAFETY PEDAL

(75) Inventor: Valentino Campagnolo, Vicenza (IT)

(73) Assignee: Campagnolo S.r.l., Vicenza (IT)

(*) Notice: Subject to any disclaimer, the term of this patent is extended or adjusted under 35 U.S.C. 154(b) by 0 days.

(21) Appl. No.: 09/886,123

(22) Filed: Jun. 22, 2001

(65) Prior Publication Data

US 2002/0029654 A1 Mar. 14, 2002

(30) Foreign Application Priority Data

Jun. 23, 2000 (IT) .................................. TO20000A00620

(51) Int. Cl.[7] .................................................. G04G 1/14
(52) U.S. Cl. ...................................................... 74/594.6
(58) Field of Search .............................. 74/594.4, 594.6; 36/131, 132

(56) References Cited

U.S. PATENT DOCUMENTS 4,735,107 A * 4/1988 Winkie ......................... 36/131
5,257,562 A * 11/1993 Nagano ...................... 74/594.2
5,279,184 A * 1/1994 Ogino ........................... 36/131
5,522,282 A * 6/1996 Nagano ........................ 36/131
5,806,379 A * 9/1998 Nagano ........................ 36/131
5,852,956 A * 12/1998 Chen ......................... 74/594.6

* cited by examiner

Primary Examiner—David A. Bucci
Assistant Examiner—Timothy McAnulty
(74) Attorney, Agent, or Firm—Volpe and Koenig, P.C.

(57) ABSTRACT

A bicycle safety pedal including a toe element for receiving a front end of the cleat and a rear fastening device, which is suitable for engaging the rear end of the cleat when the rear end of the cleat is pressed over the rear fastening device. The cleat is released by moving the rear end laterally. The resting surface of the cleat on the pedal includes a cam surface for lifting the side of the cleat, which is moved away from the centre of the pedal when the releasing rotation is imposed on the cleat. The cam surface is only arranged on the side of the pedal facing outwards (with reference to the fitting condition of the bicycle), so to be operative only when the rear end of the cleat is moved laterally outwards, i.e., distanced with respect to the bicycle, starting from the engaged position.

3 Claims, 3 Drawing Sheets

PRIOR ART

BICYCLE SAFETY PEDAL

BACKGROUND OF THE INVENTION

This invention relates to a safety pedal for bicycles, of the type comprising a device for quick coupling to a cleat fastened to the sole of a shoe, including a toe element for receiving a front end of the cleat and a rear fastening device, which is suitable for engaging the rear end of the cleat when this is pressed over said rear fastening device, and which is also suitable for releasing the cleat when this is rotated in the general plane of the pedal in such a way that its rear end moves laterally, said pedal comprising a flat resting surface for the cleat, including cam means for opposing said releasing rotation of the cleat and for lifting the side of the cleat which is moved away from the center of the pedal when said releasing rotation is imposed on the cleat.

A pedal of the type described above is disclosed, for example, in Italian patent no. 1,257,143, in the corresponding French patent no. 2,697,493, in the corresponding German patent no. 4,323,575 and in the corresponding U.S. Pat. No. 5,419,218.

FIG. 1 of the accompanying drawings is identical to FIG. 1 of the above mentioned documents. The description of each of the aforesaid documents is incorporated herein by reference.

In said known pedal, the cleat 5 to be mounted on the sole of a shoe can be rapidly coupled to the pedal. For this purpose, the front end of the cleat is received in a toe element 14 of the pedal, after which the rear end of the cleat is pressed over a horizontal arm 28 of a spring 18, which thus snap locks said rear end holding it in position. In this coupling condition, the shoe can be released from the pedal by turning the foot in the general plane of the pedal so as to move the rear end of the cleat 5 towards one of its sides. Typically, the heel of the shoe is moved laterally outwards with respect to the bicycle, in the mounted condition of the pedal on a bicycle, so that the horizontal arm 28 of the spring 18 turns on the axis of the vertical arm 27, releasing thereby the cleat 5. Furthermore, in said known pedal, the resting plane of the cleat 5 over the pedal is defined by a plate 15 fastened over the body of the pedal and including two slanted tabs 40, diverging upwards, acting as means for opposing the rotation of the cleat 5 in the general plane of the pedal. More precisely, the tabs 40 cause a cam-like effect on the cleat 5 when said releasing rotation is impressed to the latter, whereby the side of the cleat 5 which is moved away from the center of the pedal during said rotation is forced by the respective tab 40 to raise upwardly. In this way, the advantages of preventing undesired releasing of the cleat from the pedal during normal use of the bicycle is obtained, because the pressure exerted by the cyclist on the pedal opposes a lifting movement of the cleat, whilst, on the other hand, releasing of the shoe from the pedal is ensured in emergency conditions, for example in the case of a fall or in any other case in which the cyclist ceases to impose pressure on the pedal.

In the above mentioned known solution, the mode of operation described above occurs both when the heel of the shoe is moved laterally outwards with respect to the bicycle, i.e. when it is moved away from the bicycle, and when the heel of the shoe is moved laterally inwards.

SUMMARY OF THE INVENTION

The object of this invention is to improve the above mentioned known solution.

In order to achieve this object, this invention relates to a pedal having the features indicated at the beginning of this description and further characterised in that said cam means are only arranged on the side of the pedal located outwards (with reference to the mounted condition on the bicycle), so that said cam means are operative only when the rear end of the pedal is moved laterally outwards, with respect to the bicycle, from its engaged position.

In a first embodiment, said resting surface of the pedal does not present any means for opposing the rotation of the cleat on the inner side thereof, whereby the lateral inwards movement of the rear end of the cleat, starting from its engaged position, does not cause any lifting movement of the internal side of the cleat.

In a second form of embodiment, the resting surface comprises a stop on the internal side for preventing any lateral inwards movement of the rear end of the cleat.

The former embodiment mentioned above presents the advantage of being more simply constructed with respect to the known solution, without practically causing any problems, since the need to prevent accidental release of the shoe from the pedal only exists for lateral outwards movements of the shoe heel.

The second form of embodiment is instead preferable if, because of a specific structure of the pedal, the lateral inwards movement of the rear end of the cleat must be totally prevented.

Preferably, in the actual embodiments of the invention, the cam means of the pedal consist of a ramp forming part of a projection made by drawing in a metal plate which is fastened by means of screws to the body of the pedal. Similarly, in the second embodiment mentioned above, said stop preferably consists of a projection made by drawing in said metal plate.

BRIEF DESCRIPTION OF THE DRAWINGS

Further features and advantages of this invention will become apparen from the following description, with reference to the annexed drawings, given purely by way of non-limiting example, in which.

DETAILED DESCRIPTION OF THE INVENTION

Figure 1:
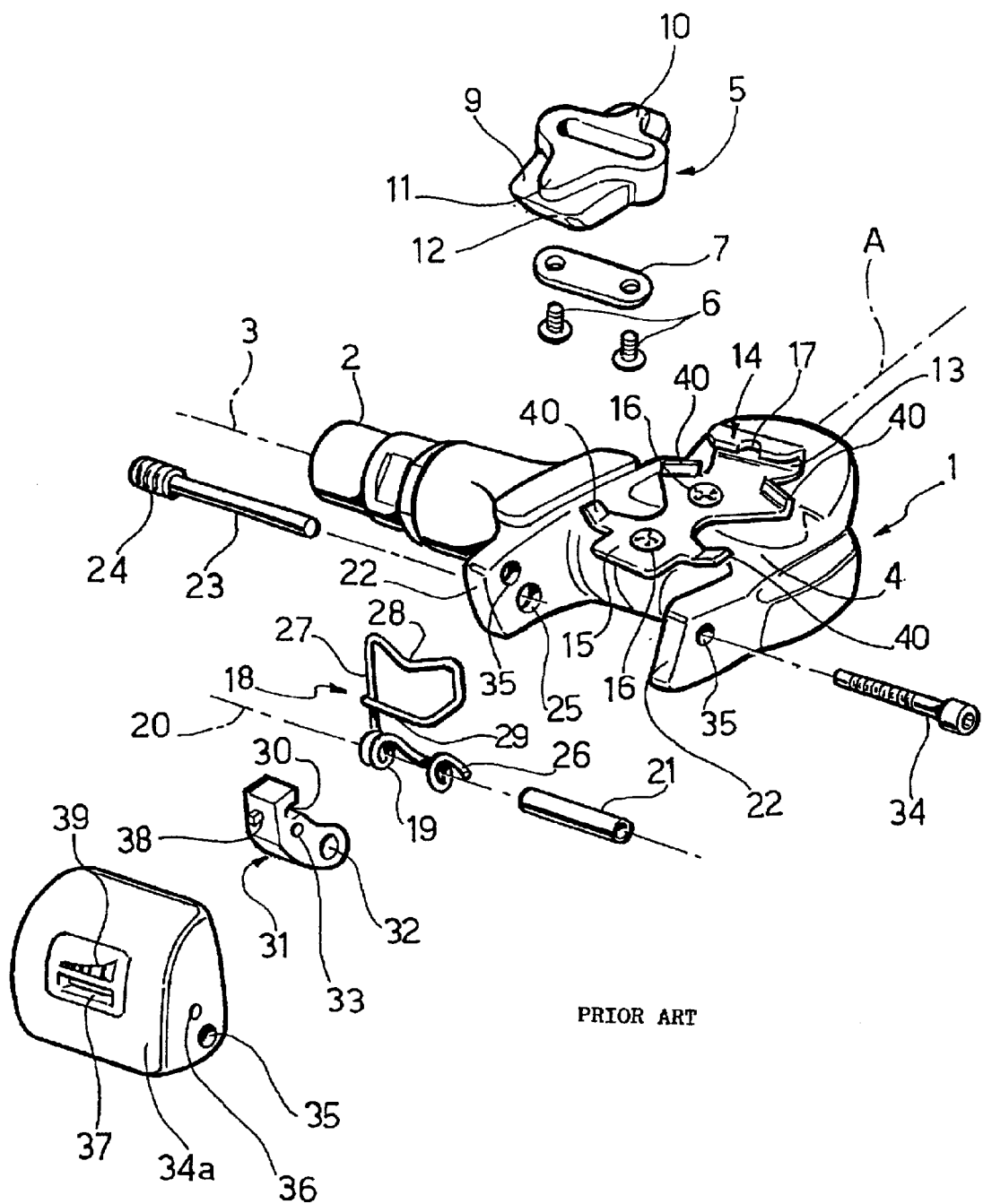
FIG. 1 is a perspective exploded view of the pedal according to the prior art.
Figure 2:
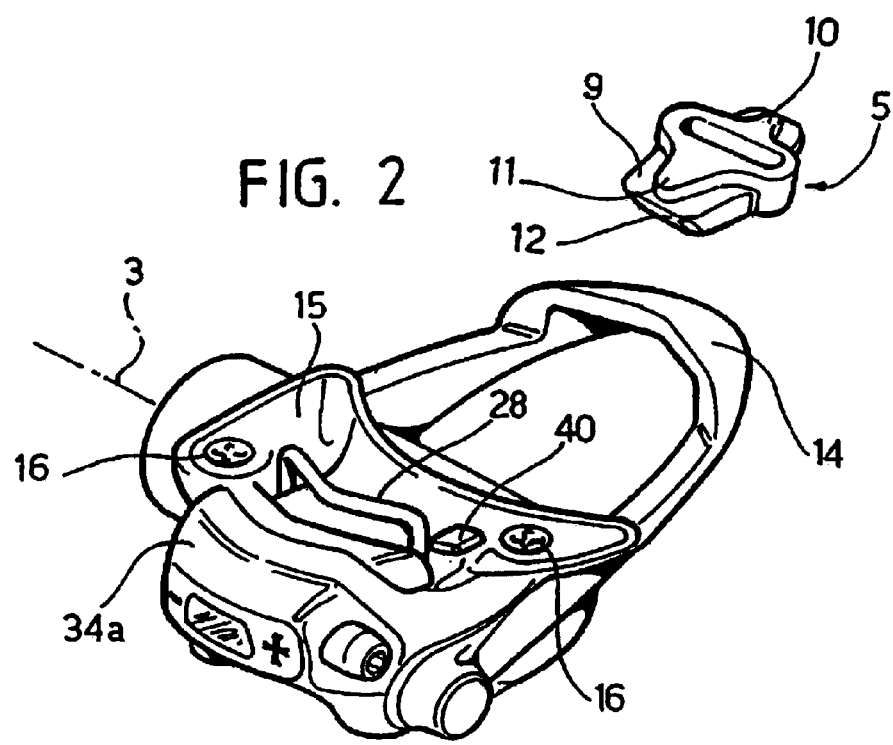
FIG. 2 is a perspective view of a first embodiment of the pedal according to this invention.
Figure 3:
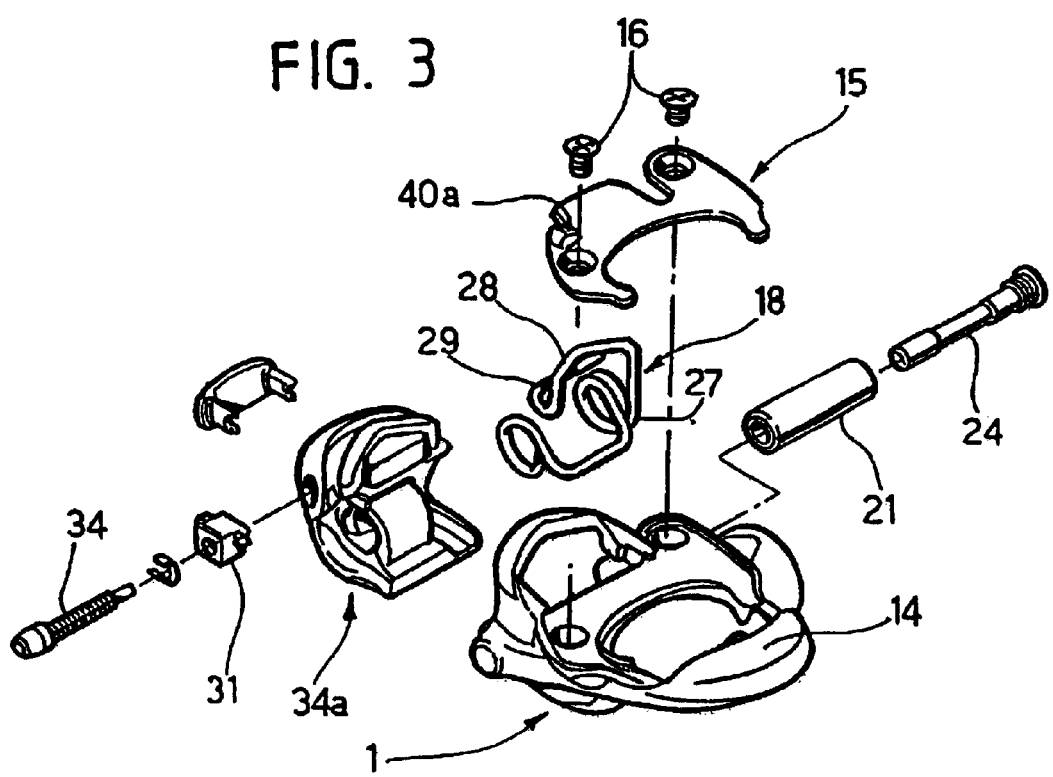
FIG. 3 is a perspective exploded view of the pedal in FIG. 2.

FIG. 2 illustrates a perspective view of a pedal which is essentially identical with the pedal in FIG. 1, with the exception that in this case the tab 40 on the internal side, i.e. of the side facing the bicycle in the mounted condition of the pedal (i.e. the left side with reference to FIG. 2), has been totally eliminated, while the tab 40 on the opposite side of the pedal remains. FIG. 3 illustrates a perspective exploded view of the pedal in FIG. 2, the only difference lying in that the cut and bent tab 40 on the outer side is replaced by a ramp 40a forming part of a projection made by drawing in the metal plate 15 defining the resting surface of the cleat (which is not illustrated in FIGS. 2, 3). For the rest, the pedal illustrated in FIGS. 2, 3 is essentially identical, as mentioned, to the known pedal in FIG. 1, with the exception of a different structure and arrangement of the various elements. In FIGS. 2, 3, the elements corresponding to those illustrated in FIG. 1 are identified with the same reference numerals. The metal plate 15 defining the ramp 40a arranged on the external side of the pedal is fastened by means of two screws 16 to the body of the pedal.

Figure 4:
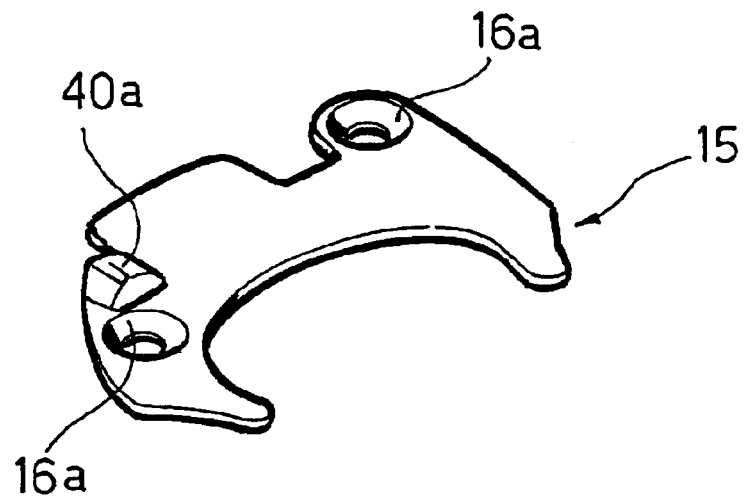
FIG. 4 is a view at an enlarged scale of a detail of FIG. 3

FIG. 4 illustrates a view at an enlarged scale of the plate 15 with two holes 16a for the passage of screws 16 and the projection defining the ramp 40a, obtained by drawing. In the pedal described above—both in the variant described in FIG. 2, with a slanted tab 40, and the variant illustrated in FIGS. 3, 4, with the ramp 40a obtained by drawing—the cleat is coupled to the pedal in a way which is identical to that of the pedal according to the known technique described in FIG. 1. For releasing the cleat from the pedal, the operation is different according to whether the rear part of the cleat is moved laterally outwards or inwards (always with respect to the bicycle, with reference to the mounted condition of the pedal on the bicycle). In the case of the example illustrated in the drawings, referring to a right-hand pedal, if the rear part of the cleat is moved rightwards, i.e. outwards with respect to the bicycle, the operation is again identical to that of the pedal in FIG. 1. This is because, in this case, the rear part of the cleat acts on the spring 18 so to make it turn around the vertical axis of the part 27, whereby causing release. At the same time, the bottom surface of the cleat "climbs" over the tab 40, or over the ramp 40a (in the case of the variant in FIG. 2 or variant in FIG. 3, respectively), whereby the side of the cleat which tends to move away from the center of the pedal is lifted. This prevents the accidental release of the shoe from the pedal during normal use of the bicycle, when the cyclist applies pressure on the pedal, while release of the pedal in emergency conditions is favoured, for example in the case of falling, when the cleat is no longer pressed against the plate 15 by the force applied by the cyclist to the pedal. As can be seen, conversely, both the variant in FIG. 2 and variant in FIGS. 3,4, are not equipped with any type of cam means on the internal side of the pedal, i.e. the side facing the bicycle, reason for which a lateral inwards movement of the rear part of the cleat can occur without lifting the internal side of the cleat.

Figure 5:
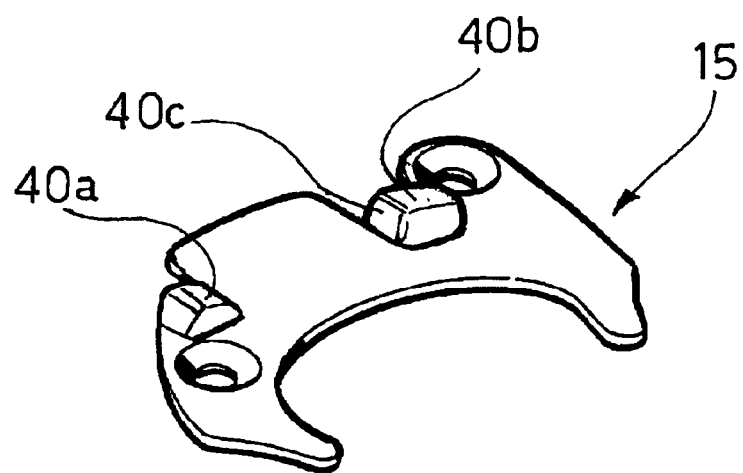
FIG. 5 illustrates a variation of FIG. 4 referred to the second embodiment of this invention.

FIG. 5 illustrates a variant of FIG. 4, which is referred to the second embodiment of this invention. In this case, plate 15 on the external side of the pedal is equipped with a ramp 40a (or, alternatively, the tab 40), while a stop element 40b is arranged on the internal side, which in the example illustrated in FIG. 5 is defined by a projection obtained by drawing of the plate 15, with a stop surface 40c essentially perpendicular to the plate 15 and the axis 3 of the pedal pin, which prevents any lateral inwards movement of the rear part of the cleat. An alternative to tab 40b obtained by drawing, could be a stop surface 40c defined by a tab cut from the plate 15 and bent upwardly. In the second embodiment, any possibility of release of the cleat from the pedal following a lateral movement of the rear part of the cleat inwards, (i.e. towards the bicycle with reference to the mounted condition) is prevented.

Naturally, while the principle of the invention remains the same, the details of construction and the embodiments may widely vary with respect to what has been described and illustrated herein, without departing from the scope of the invention.

For example, the pedal of the invention may have a double-face arrangement, with a plate identical to plate 15 arranged on the opposite side of the pedal

What is claimed is:

1. Safety pedal for bicycles, comprising:
   a toe element for receiving a front end of a cleat fastened to a sole of a shoe and a rear fastening device for engaging a rear end of the cleat when the rear end of the cleat is pressed over said rear fastening device and for releasing the cleat when the rear end of the cleat is rotated in a general plane of the pedal so the rear end of the cleat is moved laterally, said pedal comprising inward and outward edges and a cleat contact surface including unidirectional means for opposing rotation of the cleat, and for lifting a side of the cleat adjacent to the outward side of the pedal when the rear end of the cleat is moved laterally toward the outward side of the pedal;
   wherein a stop is defined by a projection integral with a metal plate fastened to the pedal defining the cleat contact surface, and wherein the stop comprises a stopping surface that is perpendicular to the cleat contact surface and to the axis of the pedal.

2. Safety pedal according to claim 1, wherein an internal side of said cleat contact surface does not present any means for opposing the rotation of the cleat, so that a lateral inwards movement of the rear end of the cleat, from the engaged position, does not lift the internal side of the cleat.

3. A contact plate for a bicycle safety pedal that engages with a cleat fastened to a rider's shoe, the safety pedal having a front portion, a rear portion, an inward portion and an outward portion which define an outline of the pedal and an upper plane; the cleat having a front portion, a rear portion, an inward portion and an outward portion which define an outline of the cleat and a lower plane; the cleat's outlines fits within the pedal's outline and its lower plane opposes the pedal's upper plane; and the pedal's upper plane includes a upwardly extending locking member which releasable engages the rear portion of the cleat to retain the cleat in the pedal, and an area adjacent to the locking member for fixing a contact plate comprising:
   a U-shaped base plate having inward and outward portions and means for fixing the contact plate to the pedal's upper plane, the plate's outward portion includes a single ramp positioned to contact a rear outward portion of the cleat only when the cleat is rotated outwardly and to release the cleat from the locking member.

* * * * *